2,957,874
ENDOXOPYRIDAZINES

Clarence W. Huffman, Chicago, Ill., assignor to Monsanto Chemical Company, St. Louis, Mo., a corporation of Delaware No Drawing. Filed Mar. 18, 1958, Ser. No. 722,157

13 Claims. (Cl. 260—250)

The present invention relates to the production of a new class of compounds, and more particularly is concerned with a method for preparing endoxopyridazines and the new compounds prepared thereby.

It is, therefore, the principal object of the present invention to prepare a new class of compounds comprising certain endoxopyridazines.

The reaction of furan, its homologs and substituted furans with dienophiles in the so-called Diene Synthesis is described in some detail in the prior art. (See "The Furans," Dunlap and Peters, Reinhold Publishing Company, 1953, American Chemical Society Monograph Series No. 119.) I have discovered that furan, its homologs and certain substituted furans, react with a dialkyl azodicarboxylate to yield certain endoxopyridazines in a manner analogous to the Diene Synthesis previously described.

In my process, the unsaturated tetrahydro adduct is prepared by the reaction of furan or a derivative thereof and an azodicarboxylate ester. The tetrahydro derivative is readily converted to the corresponding hexahydro compound by hydrogenation.

The novel process of this invention, and the novel compounds resulting therefrom, can be represented by the following equation:

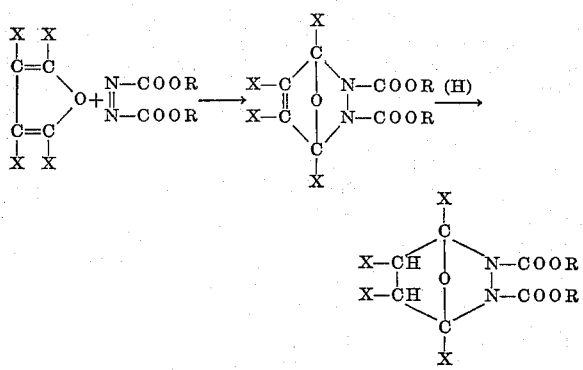

wherein R represents an alkyl radical containing from 1 to 8 carbon atoms and X is selected from the group consisting of the halogens, hydrogen, alkyl radicals containing from 1 to 8 carbon atoms and

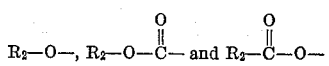

radicals wherein $R_2$ represents an alkyl radical containing from 1 to 8 carbon atoms.

The examples which follow are presented to better illustrate the manner of preparing representative members from the class of new type compounds covered by the present invention. It will be obvious to those skilled in the art that various modifications may be effected in the procedural steps set forth. Such modifications within the purview of those skilled in the art are intended to fall within the scope of the appended claims.

Example 1

Diethyl azodicarboxylate (34.8 g.), isopropyl ether (100 ml.) and furan (15 g.) were mixed in the order named in a flask. The reaction mixture became warm to the hand within an hour, but slight cooling with tap water to room temperature prevented any further temperature rise. A heavy, yellow oil layer accumulated in the bottom of the flask. Six days after the start of the reaction the heavy, yellow oil layer was separated by decantation from a yellow upper isopropyl ether layer, and washed with 10 ml. isopropyl ether. A mixture of the washed heavy, yellow oil and 50 ml. isopropyl ether over a period of five days produced a yellow crystalline solid which was filtered, washed with isopropyl ether (20 ml.) and dried under vacuum at room temperature. This gave 35.0 g. (72.3% yield) of crude faint yellow 1,2-dicarbethoxy-3,6-endoxo-1,2,3,6-tetrahydropyridazine, M.P. 115° C.–130° C. A portion of the product was purified by fractional crystallization from a number of solvents and then analyzed. Analysis calculated from $C_{10}H_{14}O_5N_2$: C, 49.6%; H, 5.79%; N, 11.6%. Found: C, 49.6%; H, 5.94%; N, 11.3%.

Refluxing for 8 hours the yellow upper isopropyl ether layer combined with the isopropyl ether washes yielded an additional 16.4 g. of crude product.

(For preparation of diethyl azodicarboxylate see N. Rabjohn, Organic Synthesis 28, 59 (1948).)

Example 2

Dimethyl azodicarboxylate (35.7 g.), isopropyl ether (105 ml.) and furan (17.5 g.) were mixed in the order named in a flask equipped with a reflux condenser. In 20 minutes the temperature of the mixture rose to 40° C., and for 35 minutes it was maintained at 30° C.–40° C. by occasional cooling. Stirring the mixture overnight at room temperature gave a yellow, solidified oil layer which was separated by decantation from a yellow isopropyl ether layer. The yellow solidified oil was dissolved in 200 ml. hot benzene, and the solution treated with "Nuchar C" type activated charcoal. The "Nuchar C" was filtered out, and upon slow addition, with stirring of isopropyl ether to the filtrate a yellow solid formed. The yellow solid was removed by filtration, washed with 20 ml. isopropyl ether followed by 20 ml. carbon tetrachloride and dried under vacuum at room temperature. This gave 46.6 g. (89%) of crude light yellow crystalline 1,2-dicarbomethoxy-3,6-endoxo-1,2,3,6-tetrahydropyridazine, M.P. 140° C.–165° C. A portion of the product was purified by fractional crystallization followed by chromatographing on aluminum oxide, and then analyzed. Analysis calculated for $C_8H_{10}N_2O_5$: C, 44.7%; H, 4.70%; N, 13.1%. Found: C, 44.3%; H, 4.74%; N, 11.6%.

Refluxing the yellow isopropyl ether layer for 2 hours yielded an additional 3.3 g. of crude crystalline product.

(For preparation of dimethyl azodicarboxylate see Diels and Paquin, Berichte 46, 2007 (1913).)

Example 3

Crude 1,2-dicarbethoxy-3,6-endoxo-1,2,3,6-tetrahydropyridazine (20.7 g.) was dissolved in 75 ml. warm ethanol, added to 0.2 g. platinum oxide catalyst, and then hydrogenated in a Parr hydrogenator. Hydrogenation was complete in 30 minutes, at room temperature. The catalyst was removed by filtration, and upon adding 300 ml. water to the filtrate an oil layer was obtained. The oil layer (10 g.) was separated by decantation. Attempts to obtain a crystalline product from the oil layer was unsuccessful. The oil was dissolved in ether and treated with sodium sulfate to remove water, and then filtered and the ether removed under vacuum, leaving a residue of 1,2-dicarbethoxy-3,6 - endoxo-hexahydropyridazine. Analysis calculated for $C_{10}H_{16}N_2O_5 \cdot C_2H_5OH$: C, 49.7%; H, 7.65%; N, 9.65%. Found: C, 50.9%; H, 7.09%; N, 10.1%.

Evaporation of the aqueous solution from which the above oil separated gave 8.0 g. of a dark oil. This oil would not yield a crystalline product.

*Example 4*

Crude 1,2-dicarbomethoxy-3,6-endoxo-1,2,3,6-tetrahydropyridazine (21.4 g.) was dissolved in 75 ml. methanol, added to 0.2 g. of platinum oxide catalyst and then hydrogenated in a Parr hydrogenator. The catalyst was removed by filtration, and the filtrate evaporated under vacuum to a dark oil (21.7 g.). Attempts to obtain a crystalline product gave a small quantity of yellow crystalline solid and 1,2-dicarbomethoxy-3,6-endoxohexahydropyridazine as an oil (15.0 g.).

Analysis of the oil calculated for $$C_8H_{12}N_2O_5 \cdot 3CH_3OH:$$

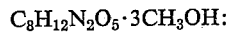

C, 42.3%; H, 7.7%; N, 8.96%. Found for oil: C, 40.8%; H, 5.83%; N, 8.55%.

*Example 5*

Diethyl azodicarboxylate (14.6 g.), isopropyl ether (30 ml.) and dimethylfuran (9.6 g.) were mixed in the order named in a flask equipped with a condenser. The reaction mixture became hot and it was cooled with tap water to room temperature within an hour. Upon standing overnight the reaction mixture became light red in color. It was concentrated by heating under vacuum on steam bath to yield 21.1 g. of a yellow oil.

A portion of the yellow oil was dissolved in isopropyl ether, treated with "Nuchar C" type activated charcoal, then adsorbed on a column of aluminum oxide and eluted with methanol in an attempt to purify the oil. Evaporation of the methanol still gave 1,2-dicarbomethoxy-3,6-di-methyl-3,6-endoxo-1,2,3,6-tetrahydropyridazine as a yellow oil. Analysis, percent calculated for $C_{12}H_{18}N_2O_5$: N, 10.03. Found: N, 9.02.

The existence of the specified product was further confirmed by an infrared spectrophotometric examination of the purified product.

*Example 6*

Ethyl furoate (14.0 g.), isopropyl ether (50 ml.) and diethylazodicarboxylate were mixed together in the order named in a flask equipped with a condenser. The mixture was an orange color. There was no apparent reaction at room temperature so the mixture was refluxed for 7 hours. The reaction mixture was treated with "Nuchar C" type activated charcoal and then concentrated under vacuum on a steam bath to yield 27.3 g. of an orange-red oil.

A portion of the yellow oil was dissolved in isopropyl ether, the insolubles being discarded, the solution treated with "Nuchar C" type activated charcoal, then adsorbed on a column of aluminum oxide and eluted with methanol. Evaporation of the methanol gave a yellow oil.

An infrared spectrophotometric examination indicated that 1,2,3 - tricarbethoxy-3,6-endoxo-1,2,3,6-tetrahydropyridazine had formed.

*Example 7*

The procedure set forth in Example 1 is repeated using 0.2 mol of 2,5-dichlorofuran and 0.2 mol of di-2-ethylhexyl azodicarboxylate, 1,2-di-(carbo-2-ethylhexoxy)-3,6-dichloro-3,6-endoxo - 1,2,3,6-tetrahydropyridazine is obtained which on hydrogenation as described in Example 4 yields 1,2 - di - (carbo-2-ethylhexoxy)-3,6-dichloro-3,6-endoxohexahydropyridazine.

*Example 8*

The procedure set forth in Example 1 is repeated using 0.2 mol of 3,4-dibutoxyfuran and 0.2 mol of di-n-hexyl azodicarboxylate. 1,2 - di - (carbo-n-hexoxy)-4,5-dibutoxy - 3,6 - endoxo-1,2,3,6-tetrahydropyridazine is obtained which on hydrogenation as described in Example 4 yields 1,2-di-(carbo-n-hexoxy)-4,5-dibutoxy-3,6-endoxohexahydropyridazine.

*Example 9*

The procedure set forth in Example 1 is repeated using 0.2 mol of 2,5-di-n-octylfuran and 0.2 mol of di-n-propyl azodicarboxylate. 1,2-di-(carbo-n-propoxy(2,6-di-n-octyl-3,6-endoxo-1,2,3,6-tetrahydropyridazine is obtained which on hydrogenation as described in Example 4 yields 1,2-di-(carbo-n-propoxy)-3,6-di-n-noctyl-3,6-endoxohexahydropyridazine.

*Example 10*

The procedure set forth in Example 1 is repeated using 0.2 mol of 2,3,4,5-tetramethylfuran and 0.2 mol of di-methyl azodicarboxylate. 1,2-dicarbomethoxy-3,4,5,6-tetramethyl-3,6-endoxo-1,2,3,6-tetrahydropyridazine is obtained which on hydrogenation as described in Example 4 yields 1,2-dicarbomethoxy - 3,4,5,6 - tetramethyl-3,6-endoxohexahydropyridazine.

*Example 11*

The procedure set forth in Example 1 is repeated using 0.2 mol of 2,5-di-carbopentoxy-furan and 0.2 mol of diethyl azodicarboxylate. 1,2-dicarbethoxy - 3,6 - di-carbopentoxy-3,6-endoxo-1,2,3,6-tetrahydropyridazine is obtained which on hydrogenation as described in Example 4 yields 1,2-dicarbethoxy-3,6-di-carbopentoxy-3,6-endoxohexahydropyridazine.

*Example 12*

The procedure set forth in Example 1 is repeated using 0.2 mol of 2,5-di-acetyl-furan and 0.2 mol of dimethyl azodicarboxylate. 1,2-dicarbomethoxy-3,6-di-acetyl-3,6-endoxo-1,2,3,6-tetrahydropyridazine is obtained which on hydrogenation as described in Example 4 yields 1,2-dicarbomethoxy-3,6-di-acetyl-3,6 - endoxo-hexahydropyridazine.

*Example 13*

The procedure set forth in Example 1 is repeated using 0.2 mol of 2-n-caproylfuran and 0.2 mol of diethyl azodicarboxylate. 1,2 - dicarbethoxy - 3 - n-caproyl - 3,6-endoxo-1,2,3,6-tetrahydropyridazine is obtained which on hydrogenation as described in Example 4 yields 1,2-dicarbethoxy-3-n-caproyl-3,6-endoxo - hexahydropyridazine.

The procedures set forth in the preceding examples can be varied to prepare the novel compounds of this invention. The reactants can be employed in stoichiometric quantities or an excess of either can be used. Slightly elevated reaction temperatures are preferred. Reaction temperatures ranging from about 25° C. to about 80° C. are suitable. The reaction is preferably carried out in a solvent medium and any inert organic solvent can be used.

The compounds of this invention are useful as intermediates and as contact insecticides. This latter utility was demonstrated by contacting ants with various pyridazines of this invention. The ants were killed on contact.

This application is a continuation-in-part of copending application Serial No. 557,641, filed January 6, 1956, now abandoned.

What is claimed is:

1. Endoxopyridazines selected from the group consisting of compounds represented by the formula:

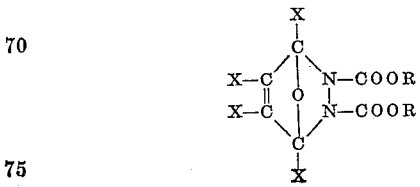

and

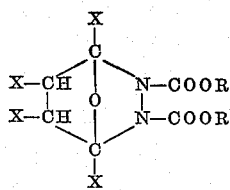

wherein R represents an alkyl radical containing from 1 to 8 carbon atoms and X is selected from the group consisting of the halogens, hydrogen, alkyl radicals containing from 1 to 8 carbon atoms and

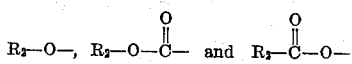

radicals wherein $R_2$ represents an alkyl radical containing from 1 to 8 carbon atoms.

2. 1,2 - dicarbomethoxy-3,6-endoxo-1,2,3,6-tetrahydropyridazine.

3. 1,2 - dicarbethoxy - 3,6 - endoxo - 1,2,3,6-tetrahydropyridazine.

4. 1,2 - dicarbomethoxy - 3,6-endoxo-hexahydropyridazine.

5. 1,2-dicarbethoxy-3,6-endoxo-hexahydropyridazine.

6. 1,2,3 - tricarbethoxy - 3,6-endoxo-1,2,3,6-tetrahydropyridazine.

7. A process for preparing endoxopyridazines which comprises reacting together a dialkyl azodicarboxylate having the formula

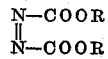

with a compound represented by the formula

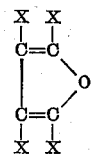

wherein R represents an alkyl radical containing from 1 to 8 carbon atoms and X is selected from the group consisting of the halogens, hydrogen, alkyl radicals containing from 1 to 8 carbon atoms and

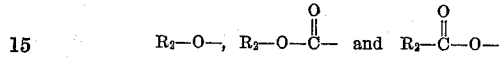

radicals wherein $R_2$ represents an alkyl radical containing 1 to 8 carbon atoms.

8. A process as described in claim 7 which includes the step of hydrogenating the resulting tetrahydro-endoxopyridazine derivative to form the hexahydro-endoxopyridazine derivative.

9. A process for preparing 1,2-dicarbomethoxy-3,6-endoxo-1,2,3,6-tetrahydropyridazine which comprises reacting dimethyl azodicarboxylate with furan.

10. A process for preparing 1,2 - dicarbethoxy - 3,6-endoxo-1,2,3,6-tetrahydropyridazine which comprises reacting diethyl azodicarboxylate with furan.

11. A process for preparing 1,2-dicarbomethoxy-3,6-endoxo-hexahydropyridazine which comprises reacting dimethyl azodicarboxylate with furan and hydrogenating the resultant product.

12. A process for preparing 1,2 - dicarbethoxy - 3,6-endoxo-hexahydropyridazine which comprises reacting diethyl azodicarboxylate with furan and hydrogenating the resultant product.

13. A process for preparing 1,2,3-tricarbethoxy-3,6-endoxo-1,2,3,6-tetrahydropyridazine which comprises reacting diethyl azodicarboxylate and ethyl furoate.

No references cited.